Aug. 12, 1969　　　　　J. R. JOHNSON　　　　　3,460,669
CONTAINER INDEXING AND ROTATING

Filed July 31, 1967　　　　　　　　　　　　3 Sheets-Sheet 1

INVENTOR.
JOHN R. JOHNSON
BY
ATTORNEYS

Aug. 12, 1969    J. R. JOHNSON    3,460,669
CONTAINER INDEXING AND ROTATING
Filed July 31, 1967    3 Sheets-Sheet 2

INVENTOR.
JOHN R. JOHNSON
BY
ATTORNEYS

Aug. 12, 1969  J. R. JOHNSON  3,460,669
CONTAINER INDEXING AND ROTATING
Filed July 31, 1967  3 Sheets-Sheet 3

INVENTOR.
JOHN R. JOHNSON
BY
ATTORNEYS

3,460,669
CONTAINER INDEXING AND ROTATING
John R. Johnson, Toledo, Ohio, assignor to Owens-
Illinois, Inc., a corporation of Ohio
Filed July 31, 1967, Ser. No. 657,095
Int. Cl. B65g 47/24, 29/00
U.S. Cl. 198—33                                    8 Claims

ABSTRACT OF THE DISCLOSURE

In mechanism for handling containers through a series of inspection operations, the containers are moved in series on a conveyor to the inspection device. A pocketed indexing head positioned with its periphery overlying a portion of the conveyor receives the containers to be inspected in a pocket of the head. The head is rotated through a predetermined angle to position the container at a first inspection station. Since the head contains a plurality of pockets, a plurality of containers are indexed by the head into and out of plural inspection stations. The containers are confined between a guide rail and an endless belt, with the belt bearing against the side of the container. The belt is supported by pulleys on the head and is driven independently of the head so as to rotate the containers about their respective axes for inspection purposes.

Background of the invention

This invention relates to bottle handling mechanism for receiving and moving bottles in series through a plurality of inspection stations, with the bottles being rotated at each inspection station.

In glass bottle forming operations, the containers are formed to their final shape and then passed through an annealing lehr where any thermal stresses are removed from the bottles and the bottles are cooled down to a temperature approaching that of room temperature. The bottles are then taken from the lehr, placed in line on a conveyor. The bottles are arranged in series, one after another, and the bottles are normally viewed by an inspector. After the bottles have passed the inspector, they may be packed in cartons. It has been found necessary that the bottles or containers be introduced into mechanical and optical inspection equipment which will more closely examine the bottle for specific defects and segregate those bottles which are defective from those which are acceptable.

This invention concerns itself with the mechanism for handling bottles through a plurality of inspection stations, with the mechanism being compact and providing a means for rotating the bottles while they are at each of the inspection stations, wherein the rotating mechanism is simple and effective for rotating the bottles about their axes and confining the bottles to a specific location so that they may be viewed optically or gauged mechanically.

It has been the practice in the past, and as particularly shown in applicant's prior U.S. Patent No. 3,313,409, dated Apr. 11, 1967, to provide an indexing table or head which receives containers into pockets formed in the head. The head is then indexed through a specific angle or degree of rotation to successively position the containers beneath inspection devices of both optical and mechanical nature. At most of the locations where the inspections are taking place, it is necessary that the containers be rotated about their axes so that the inspection may be complete as far as the entire circumference of the bottle is concerned.

As specifically shown and described in the above-referred-to patent, the containers are inspected for internal diameter, outer diameter, height, warp and dip, cocked finish, vertical checks and horizontal checks. With the exception of the internal diameter measurement, it is necessary that the bottles be rotated while the measurements are carried out. The containers are rotated at each of these stations by providing a vacuum plate onto which the container is moved by the indexing head, and the vacuum plate is then rotated at a fairly high speed. Thus it can be seen that considerable mechanism is required, both for providing vacuum connections to the rotating pads, as well as mechanical mechanism geared to the pad so that they may be rotated. Additionally, timing mechanism may be required to initiate rotation of the pads at some period after completion of the index of the pocketed head or turret to bring the containers to the pads.

It has also been the practice in mechanism of the type disclosed in the above-cited patent, to elevate the articles by raising the rotatable pad at each inspection station. This is true where the mechanism for gauging is mounted on a fixed support. This arrangement is disclosed in U.S. Patent No. 3,188,743, dated June 15, 1965, wherein one station of such a mechanism is specifically disclosed and as explained therein, it is necessary that the pad which supports the bottle at the inspection station be raised so as to bring the bottle into contact with the gauging elements.

Summary of the invention

This invention relates to a bottle indexing and rotating device in which a pocketed head or starwheel receives the bottles from a moving conveyor and moves the bottles in series around an arcuate path in a step-wise fashion with a continuously running belt in engagement with the side wall of the bottles, thus rotating the bottles about their axes.

Figure 1:
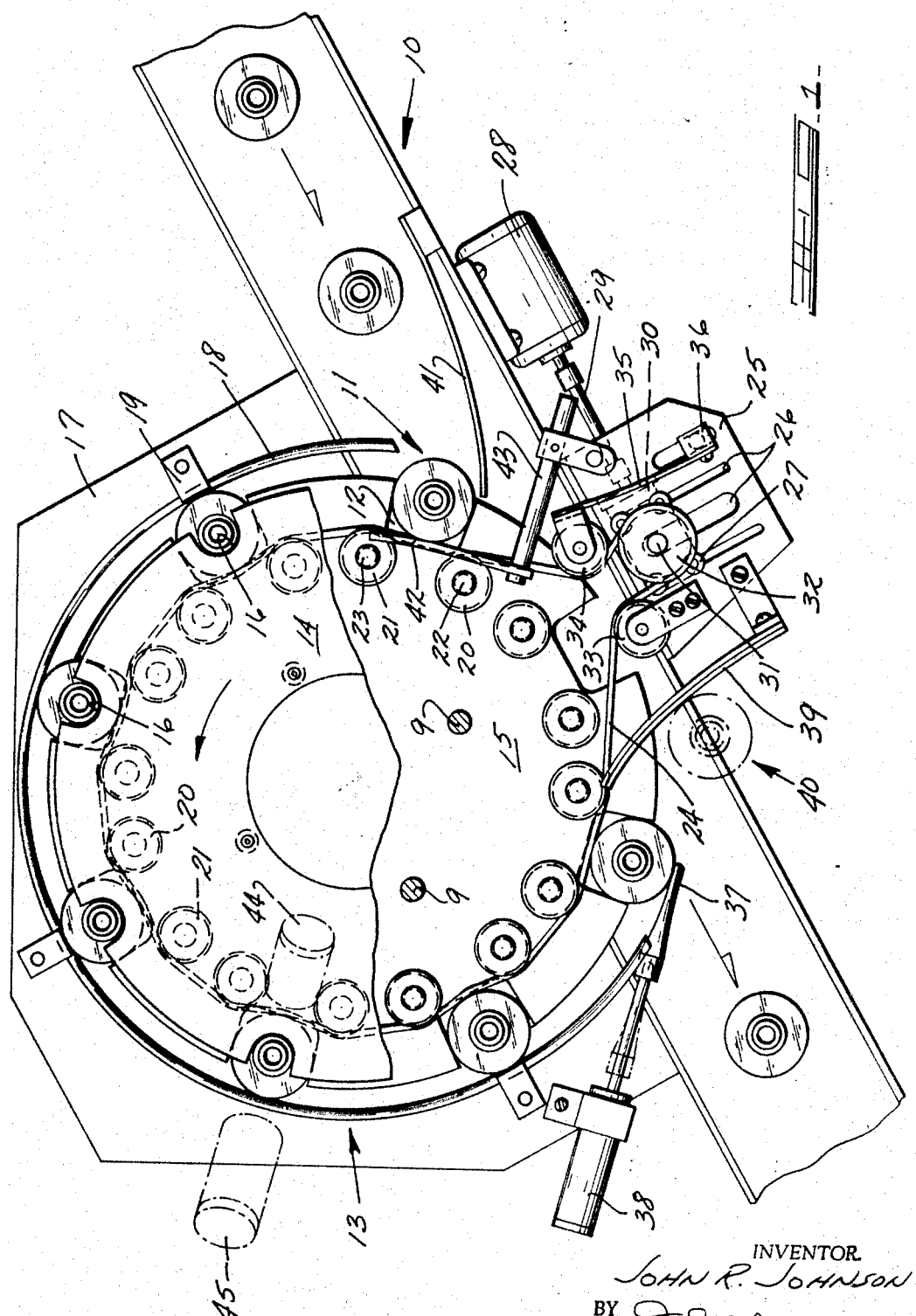
FIG. 1 is a top plan view of the bottle indexing and rotating mechanism of the invention with a portion of the head broken away.

With reference to the drawings, and in particular FIG. 1, the apparatus of the invention will be described.

As previously explained, newly formed containers which are to be inspected for defects are placed on a conveyor and, with spacing mechanism (not shown), the containers on the conveyor are spaced apart at predetermined intervals.

A conveyor 10 having its upper surface moving in the direction of the arrows shown thereon in FIG. 1, has containers positioned thereon in an upright attitude and spaced apart at predetermined intervals which are related to the rate of indexing of the later-to-be described handling mecahnism. This timed relationship can be achieved by having the drive mechanism for the handling mechanism coupled to the conveyor drive mechanism so that as a bottle arrives at the entrance area 11, a pocket 12 will be ready to receive a container. An indexing or rotating head 13 having the pockets 12 formed in its outer periphery, is composed of two spaced-apart, generally circular members 14 and 15. As best shown in FIG. 1, the member 14 is provided with a plurality of neck receiving pockets 16, while the pockets 12, which are of a generally rectangular shape, are formed in the periphery of lower circular member 15. Both of the members 14 and 15 are connected together by spacer rods 9 and operate as a single unit or head 13, it being understood that the head 13 is indexed or rotated about its center by a suitable indexing type drive mechanism. Applicant has found that the well-known Ferguson roller gear drive is suitable, as well as a Geneva drive.

Beneath the rotating members 14 and 15 there is provided a substantially flat table 17 whose upper surface is at the same level as the upper surface of the conveyor 10 so that bottles may be easily slid from the conveyor to the table.

A rail 18 formed of plastic such as nylon or Teflon is supported by clip member 19 and surrounds the circumference of the head 13 and is spaced outwardly therefrom an amount corresponding generally to the position of the side wall of a bottle when positioned within a pocket in the head. As clearly shown in FIG. 1, the rail 18 does not extend entirely around the circumference of the head, but only that arc of the circumference where it is required to maintain the bottle within the pocket in the head. Thus it can be seen that upon index or rotation of the head through a predetermined angle, the bottles contained within the pockets 12 and 16 will be moved sideways about the center of the head.

Figure 2:
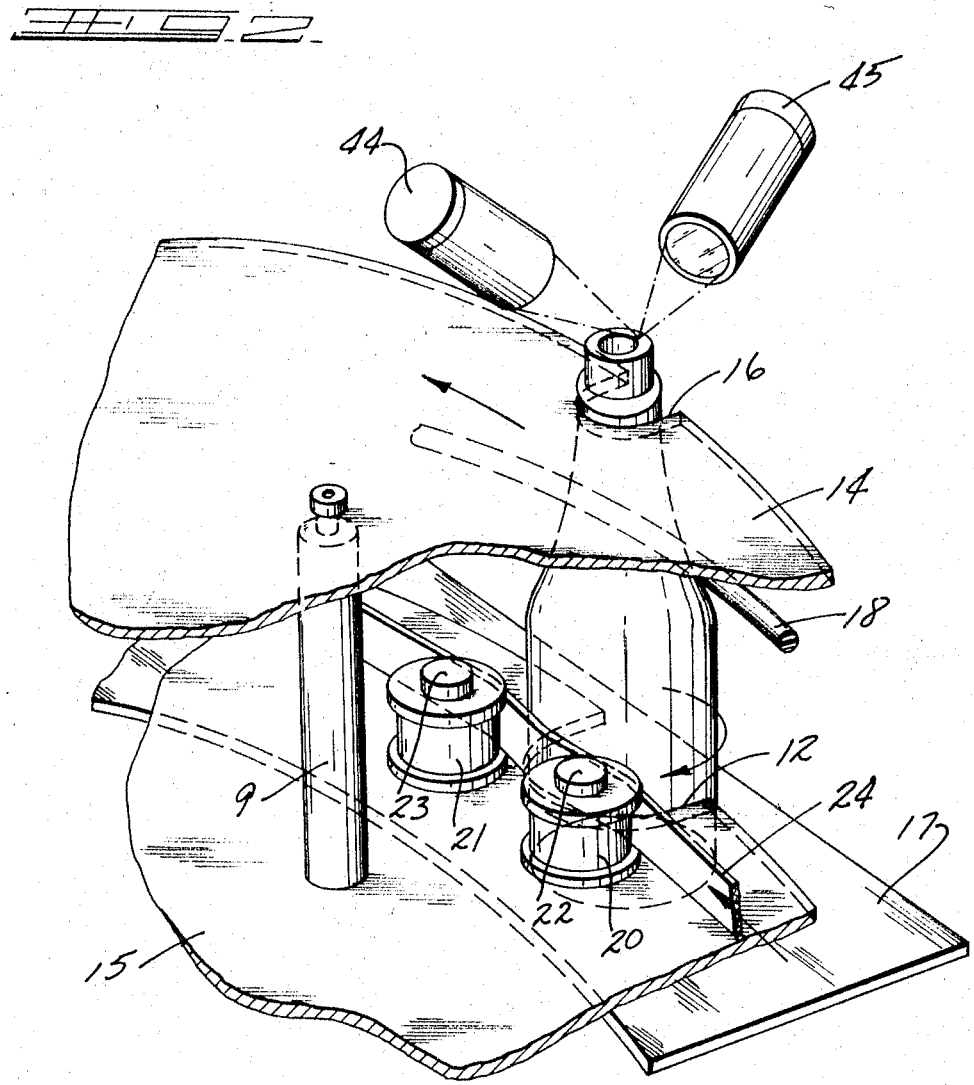
FIG. 2 is a partial perspective view, on an enlarged scale, of one inspection station of the handling mechanism of FIG. 1.
Figure 4:
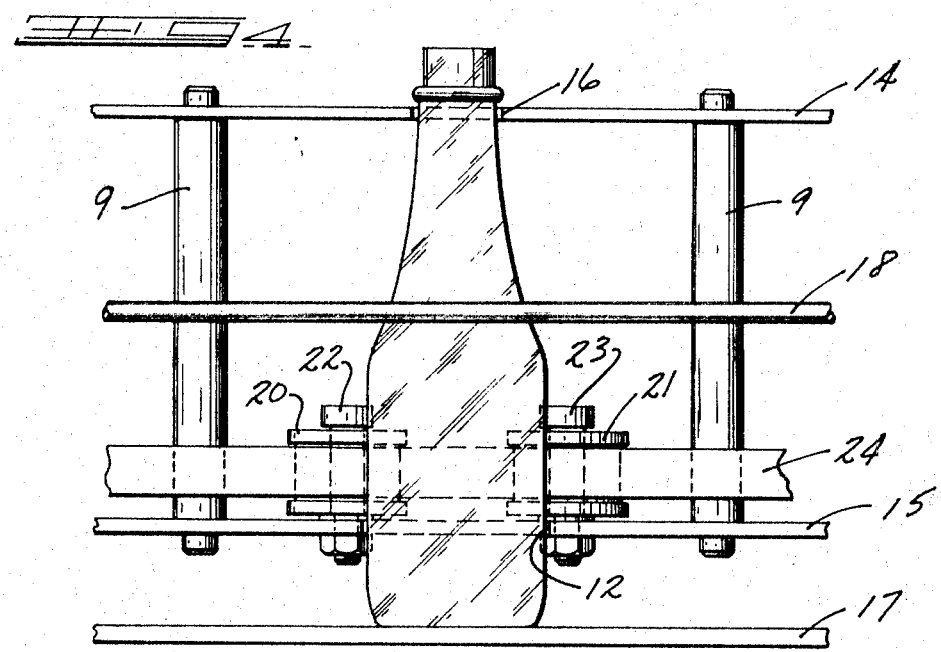
FIG. 4 is a front elevational view of the mechanism illustrated in FIG. 3.

As previously explained, it is necessary at most inspection locations that the bottles be rotated about their axes. To accomplish this, each pocket 12 has a pair of pulleys 20 and 21 associated therewith. As best shown in FIGS. 2 and 4, the pulleys 20 and 21 are mounted on studs 22 and 23 bolted to the lower member 15. The pulleys 20 and 21 are mounted on the studs so as to be free to rotate with respect to their supporting studs.

Figure 3:
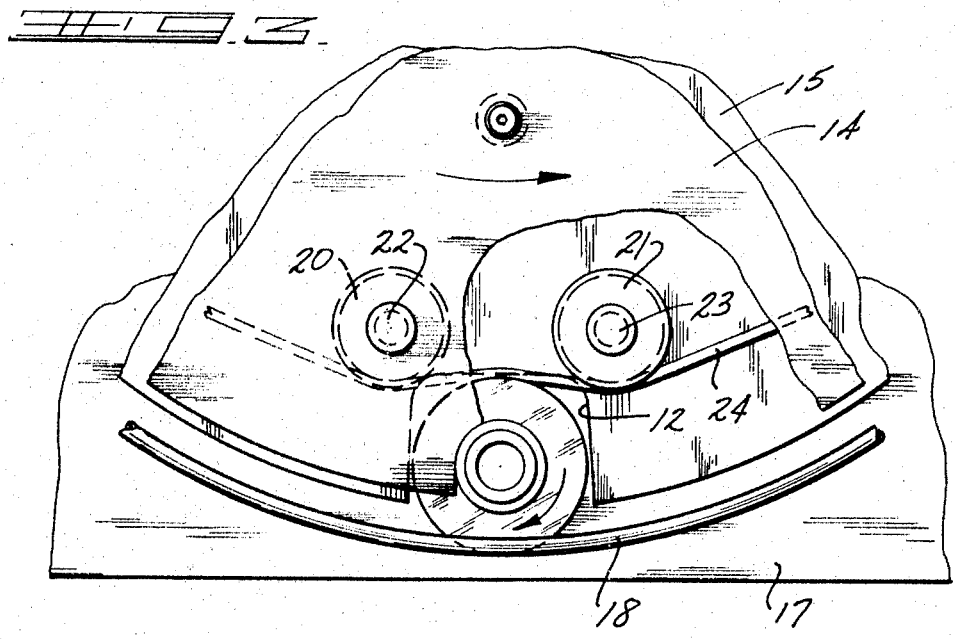
FIG. 3 is a top plan view of the mechanism illustrated in FIG. 2.

The pulleys 20 and 21 serve as guiding members for an endless drive belt 24. The drive belt extends around and is guided by the pulleys 20 and 21 and, as best seen in FIG. 3, in the run of the belt between adjacent pairs of pulleys the belt will be somewhat deflected due to its engagement with a bottle positioned in one of the pockets 12.

A mounting plate 25 is fixed to the side of the conveyor 10 opposite the side at which the head 13 is positioned. The plate 25 is provided with a plurality of elongated mounting slots 26. The slots 26 provide access for bolts which hold a drive pulley bearing housing 27 which may be adjustably mounted to the plate 25.

An electric motor 28, mounted on the side of the conveyor 10, has its drive shaft 29 connected to a gear box 30 positioned beneath the plate 25. The gear box 30 has a vertical output shaft 31 to which a drive pulley 32 is connected. The belt 24 passes around the periphery of the drive pulleys 32. A fixed idler pulley 33 is positioned in running engagement with the belt 24 and an adjustable idler pulley 34 is in engagement with the belt 24 at the opposite side of the drive pulley 32. The idler pulley 34 is carried by a spring arm 35, wtih the spring arm 35 in turn being fixed to a mounting post 36. The mounting post 36 is adjustably bolted to the plate 25. Thus it can be seen that the two idler pulleys 33 and 34 will take up any slack which may be present or develop in the belt 24 with the spring arm 35 maintaining a certain tension in the belt.

With the particular arrangement just described, it can be seen that with the motor 28 operating the drive pulley 32 will be rotated at a preselected speed, and the belt 24 will be continuously driven.

With the belt 24 in frictional engagement with the bottles at the five inspection stations positioned to the right of the conveyor 10, the bottles will be rotated about their axes and will be confined by the pockets 12 and 16 to a particular angular position and will be confined by the rail 18 to a particular radial position. In this manner the bottles are effectively located and rotated at specific predetermined positions during their movement from the incoming or entrance area 11 through the five gauging positions or stations.

A reject plunger 37, of conventional design, operated by a fluid motor 38 is reciprocable into the position shown in full line on FIG. 1 or retracted to the dotted line position. If a defective bottle has been sensed at any one of the five gauging stations, the plunger 37 will be moved to the position shown in full line on FIG. 1, thus preventing the particular defective bottle from leaving the head 13, and upon further index of the head 13, the bottle will be swept from the conveyor by a deflector arm 39 and moved to the dotted line position 40 where the bottle will be discarded; normally by the ware falling from the side of the conveyor into a cullet chute.

In order to ensure that the bottles arrive in position to be received by the pockets 12 and 16, a guide arm 41 is provided which extends along the side of the conveyor 10 with its downstream end directed toward the mid portion of the conveyor so that as the bottles are moved by the conveyor 10, they will engage the guide arm 41 and be directed into the pockets of the head 13. Since the belt 24 is constantly being driven and the run of the belt between the pulleys 20 and 21 is such that the bottle upon arrival into the pocket will be contacted by the belt, it was found desirable at the entrance station 11 to hold the side of the bottle away from the moving belt so as to prevent the bottles from being, in effect, bounced out of the pockets. This is necessary since at this particular location the confining rail 18 is not present. With this in view, a standoff finger 42 is positioned intermediate the members 14 and 15 with the finger positioned so that the bottle will contact the finger and be held away from the moving belt 24. The finger 42, as shown in FIG. 1, is mounted to an arm 43 which in turn is mounted on the plate 25.

As previously explained, the apparatus for handling and rotating the containers is primarily suited for rotating the containers during inspection at a plurality of inspection stations. With this in view, FIG. 2 illustrates schematically one such inspection device. This particular inspection device comprises a light source 44 and photocell pickup 45. This particular optical inspection arrangement would be suitable for inspecting the finish or neck portion of the container for what are termed horizontal checks. It should be understood that the other four stations will have other inspection devices positioned thereat.

While the above disclosure shows the pulleys 20 and 21 as being mounted on studs connected to the bottom member 15, it should be equally apparent that the studs 22 and 23 may be modified to extend the full distance of the members 14 and 15 and that the pulleys may then be adjustably mounted to the studs. The vertical position of the pulleys is determined to a certain extent by the configuration and height of the bottle being handled. The portion of the bottle engaged by the belt 24 would normally be that portion of the side wall which is at about the center of the gravity of the bottle. Also, the position or height of the rail 18 in relation to the bottle depends to a certain extent upon the configuration of the bottle. In the particular arrangement illustrated, the rail 18 is positioned at a height slightly above the shoulder of the bottle and actually functions to hold the bottle down against the table 17, while at the same time maintaining the bottle in contact with the drive belt 24.

While the mechanism described herein is primarily for use in handling bottles through a series of gauging and inspection stations, it should be obvious that the mechanism will have equal utility for handling and rotating the bottles in stations where operations other than gauging and inspection is taking place.

I claim:

1. Bottle indexing and rotating device comprising, an indexing head mounted for rotation about a vertical axis and having a plurality of circumferentially spaced container receiving pockets whereby said pockets are successively moved from a position for receiving containers to circumferentially displaced positions about the periphery thereof, means extending circumferentially about, and spaced outwardly from said head at an elevation intermediate the height of said head for retaining bottles within the pockets, an endless belt, means carried by said head for supporting said belt intermediate the height of said indexing head and guiding said belt with its outer surface in frictional engagement with the side wall of containers confined in said pockets and means driving said belt at a preselected speed for rotating said containers about their axes while retained in said pockets.

2. The apparatus of claim 1, further including means in engagement with said belt for maintaining said belt under predetermined tension.

3. The apparatus of claim 1, wherein said means for supporting and guiding said belt comprises a plurality of guide pulleys carried by said head in generally circular pattern.

4. The apparatus of claim 3, wherein said pulleys are mounted in pairs adjacent each bottle side wall engaging pocket of said head, with the circumference of the pulleys being such that the span of the belt extending therebetween will lie in a vertical plane which intersects a portion of the pocket.

5. Bottle indexing and rotating device in combination with a horizontal conveyor, comprising, a circular indexing head mounted for rotation about a vertical axis and having a plurality of circumferentially spaced container receiving pockets formed therein, said head being mounted adjacent the conveyor with a portion overlying said conveyor whereby said pockets are successively moved from a position overlying said conveyor for receiving containers to positions about the circumference of said head, a flat, bottle supporting member underlying said head with its upper surface at the same level as said conveyor, means extending circumferentially about a portion of said head, and spaced outwardly therefrom for retaining bottles within the pockets, an endless belt, means carried by said head supporting and guiding said belt relative to said indexing head with its outer surface in engagement with the inner radial side wall of containers positioned in said pockets, and means driving said belt at a preselected speed for rotating said containers about their axes.

6. The apparatus of claim 5, wherein said means for driving said belt comprises a drive pulley mounted on the side of said conveyor opposite the indexing head and the run of the belt extends over the width of said conveyor.

7. The apparatus of claim 5, wherein the means for supporting and guiding said belt comprises a pair of pulleys mounted adjacent each bottle side wall engaging pocket of said head, with the circumference of the pulleys being such that the span of the belt in engagement with said pulleys lies in vertical planes which intersect a portion of each of the pockets.

8. The apparatus of claim 7, further including means overlying the conveyor at the bottle entrance station to said head with a surface thereof adapted to engage the bottles upon entrance to the pocket for preventing the entering bottles from engaging the moving belt in the pocket at the entrance station.

References Cited
UNITED STATES PATENTS

| | | | |
|---|---|---|---|
| 2,368,350 | 1/1945 | Ellison | 198—33 |
| 3,096,575 | 7/1963 | Cook | 198—33 |

EDWARD A. SROKA, Primary Examiner

U.S. Cl. X.R.

198—209